United States Patent Office 3,534,855
Patented Oct. 20, 1970

3,534,855
PROCESS AND INSTALLATION FOR
CLARIFICATION OF WATER
Jean Guillerd, Paris, and Claude Valin, La Varenne,
France, assignors to Societe Anonyme dite: Compagnie
des Eaux et de L'Ozone, Paris, France
Filed Jan. 8, 1968, Ser. No. 696,419
Claims priority, application France, Feb. 16, 1967,
95,242
Int. Cl. B01d 23/24
U.S. Cl. 210—73                                          2 Claims

ABSTRACT OF THE DISCLOSURE

A process for clarifying water comprises passing water to be clarified upwardly through a filter of beds of filtrating material having a downwardly increasing granulometry at a velocity less than the self-cleaning speed, and maintaining the head loss in the filter constant so that the velocity of water through the particles of the filter will remain substantially constant while the flow rate progressively diminishes as the filter becomes clogged. When the filter is clogged and is to be cleaned, a water reserve which is maintained above the filter in an amount at least equal to the intersticial volume of the filtering materials is suddenly released after the inflow of water has been terminated so that the water reserve will rapidly flow through the filter and clean the same. In order to achieve a substantially uniform outflow at the outlet despite the variation in the individual flow rate through each filter, a plurality of filters are connected in parallel and joined to a common inlet and outlet and the filters are periodically cleaned in succession and operated at different clogging rates.

---

Figure 1:
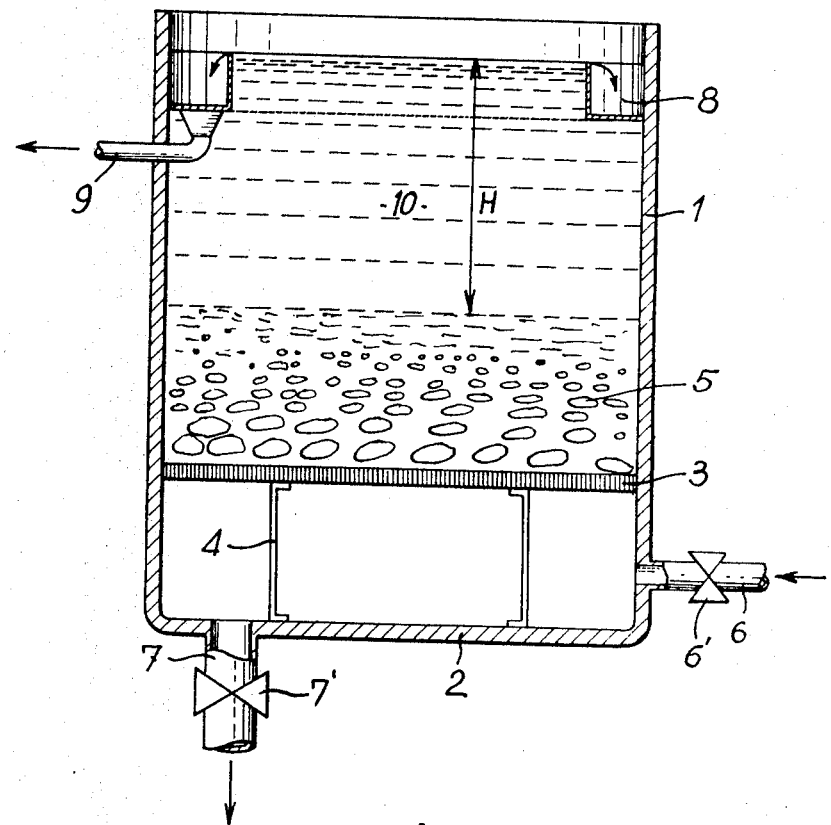

It is known that, in order to increase the retention capacity of a sand clarifier in a water treatment installation (consequently involving the desired reduction of the frequency of the washing operation), an efficient means consists in using a filtering material with a non-homogeneous granulometry. To this end, the water to be clarified, charged with substances in suspension (floculate or noncolloidal particles) runs through beds of sand which are increasingly fine. Under these circumstances, it is clear that the clarifier's capacity is used at the maximum, the large particles of materials in suspension in water being retained by the coarse sand and preventing clogging of the fine sand, as it occurs in conventional filters with sand of homogeneous granulometry.

This technique obviously requires subjecting the water to be clarified to an upward circulation, in order to avoid sorting out the sand by gravity, during operation of the clarifier and especially during washing of this sand, after a given period of operation.

A clarifier according to the invention generally comprises a perforated plate, which is porous or equipped with nozzles, intended to support the sand and to permit even admission of the water be processed or of the washing water; above this perforated plate are provided three or four beds of gravel and sand whose granulometry decreases from the bottom to the top, the upper bed consisting in sand, the actual size of which is similar to that used in conventional sand filters.

Water admitted through the perforated plate downwardly runs through the said beds and is collected at the upper part of the clarifier. Washing of the beds is effected, subsequently to open air depacking, by circulation of crude water in the direction of percolation (upwardly) and at a speed which permits setting the sand in expansion.

This type of clarifier already gives excellent results, the duration of filtering cycles being 10 to 20 times superior to that of a conventional sand filter used under similar circumstances which delivers a clarified water of substantially similar quality.

But a number of drawbacks considerably limit these advantages.

In fact, clogging of a clarifier operated by an ascending current takes place at the base of said clarifier and this clogging is important, so that washing, also performed via an ascending current, is difficult and inefficient and requires a large amount of washing water to cause the whole mass of sand to downwardly traverse the muds.

Further, the conception of these devices involves that they operate with a constant flow rate and therefore the travelling speed between the grains increases in relation with the clogging of the sand, up to the final self-cleaning speed (speed at which the adsorption energy of the muds on the surface of the sand is equal to the friction energy of water, whereby separation of the muds is obtained; when this speed is reached, and becomes exceeded, the sand is lifted and a release (or liberation) of the gathered muds takes place, the muds thus driven polluting the percolated clarified water.

In addition, such self-cleaning may be assimilated to a partial washing and the apparatus temporarily recuperates some filtering power, the running speed falling back again below the critical limit. When this limit is reached again, the clarifier releases a further amount of muds and the cycle is resumed.

This results in a very important disadvantage, consisting in that, contrary to a conventional sand filter in which the quality of filtered water remains constant, and even improves until total clogging of the filter, the ascending-current clarifier, beyond a given clogging extent, periodically causes passage in alternation of mud-charged water and clean filtered water.

It is chiefly this phenomena which slowed down the development of such most interesting technique.

A number of solutions have been proposed in order to avoid this serious drawback. All of them attempt to prevent expansion of the sand and thereby increase the limit self-cleaning speed.

However, the self-cleaning phenomena is inevitable and the fact of raising the limit speed is never sufficient to compensate for the technical complications involved.

The present invention has for a first object a process for clarifying the water by means of an ascending-current sand clarifier, which permits avoiding the above-mentioned drawbacks. In fact, according to the invention, it has been discovered that, if the granulometry of the various beds of sand is adequately selected, and if, during filtration, a constant flow between the grains is maintained instead of a total constant flow, said speed being always lower than the limit self-cleaning speed, it is possible to obtain a good quality clarified water, while maintaining a very long filtration cycle duration.

In practice, for a given granulometry of sand and a constant quality of water, it is sufficient to keep constant the loss of head which depends on the speed. It is obvious that selecting a fixed speed involves varying the flow according to the extent of sand clogging.

A first feature of the invention thus consists, in a clarifier of the type under consideration, in using sand of downward decreasing granulometry and in maintaining a constant loss of head.

According to a second feature of the invention, in order to wash (drain) the ascending current clarifier according to the invention, the washing water is caused to circulate in a direction opposite that of clarification, thus preventing the running of the muds through the mass of sand, and above the surface of the sand is provided a water reserve, the volume of which is at least that of the interstitial volume of the sand (in practice, this volume is considered as equal to the apparent volume of sand so as to ensure a safety margin) and at the bottom of the clarifier is provided a large flow discharge conduit.

During the washing operation, this mass of water rapidly runs downwardly through the whole mass of sand, removing the muds accumulated therein and discharging same through this conduit. Because of the great speed due to the size of the discharge conduit, an excellent result is obtained and the clarifier is washed and drained in a very short time.

Lastly, to the end of ensuring a constant flow in the installation including said clarifier, whatever the extent of clogging and, as a consequence, the running speed of the water therethorugh, the invention provides grouping in parallel a number of similar apparatus, respectively operating at different extents of clogging, thereby respectively ensuring different flows, but in such a way that the average flow rate $d$ of the unit is equal to as many times the nominal flow rate $d_n$ of each apparatus as there are such apparatus grouped. On this point, it should be recalled that the nominal flow rate of a filter is equal to the total flow rate of the installation divided by the number of filters. Thus, whereas in the conventional stations each filter constantly operates at this nominal flow rate, i.e. at a variable speed, and with variable losses of head, according to the invention on the contrary (except at a given time) each filter operating at a constant loss of head, but with a flow rate constantly varying, only the total flow rate being constant.

Figure 2:
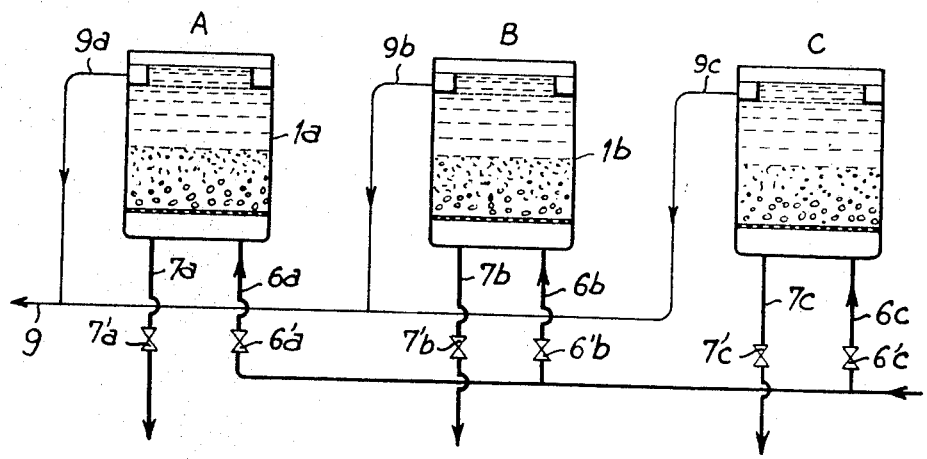

Hereafter will be described in detail a clarifier with counter currents for carrying out the process according to the invention, reference being made to the annexed drawing in which FIG. 1 is a sectional elevation view of this clarifier, and FIG. 2 shows the diagram of several clarifiers of the same type grouped according to the invention.

Referring to FIG. 1, the clarifier according to the invention comprises a cylindrical tank 1, for example made of steel or concrete, opened at the top and closed at the bottom by a plate 2. Above the bottom plate is a perforated plate 3 supported by a part 4 in turn resting on the bottom part 2; the perforated plate may consist of any other known system, provided a good distribution of the water to be processed is obtained.

On the perforated plate 3 are spread, up to about half the depth of the tank, gravel and sand beds having a downwardly decreasing granulometry.

At the bottom of the tank, between the bottom plate and the perforated plate, is provided a duct 6 for admission of the water to be clarified, connected to a conduit for the water to be clarified; similarly, a large diameter discharge conduit for the washing water is provided in 7. Each of the conduits 6 and 7 is equipped with a valve, respectively 6' and 7', valve 7' being a quick release valve.

At the upper part of the tank is provided a channel 8 for recovery of the clarified water, the base of which is connected to discharge conduit for clarified water 9.

During operation, the pipe 6 being connected to the conduit for bringing the water to be clarified, valve 6' is opened and the water, after having filled the space comprised between the bottom plate 2 and the perforated plate 3 of the tank flows through the openings of said perforated plate, then, upwardly through the successive beds of gravel and sand, and is collected in the clarified state at the upper part of the tank, forming a water reserve 10, of a height H above the level of the sand. The clarified water is recovered by means of channel 8 and 9. When the clarifier is clogged to a large extent, the valve 6' controlling the admission of water to be clarified is closed, the valve 7' of the discharge pipe 7 is opened, and the clarified water in the water tank above the level of the sand downwardly very quickly through the mass of sand and gravel, driving the muds accumulated in the openings of the perforated plate 3, in the space extending betwen the perforated plate and the bottom plate, and then via pipe 7 in the discharge conduit.

As an example, with a clarifier according to the invention having the following characteristics.

Sand granulometry:
  Bed of 20 mesh pebbles: height of 5 to 7 cm.
  Bed of 40 mesh gravel: height of 2 to 3 cm.
  Bed of 100 mesh of small gravel: height of 0.4 to 0.5 cm.
  Bed of 50 mesh sand: height of 0.2 to 0.3 cm.
  Bed of 50 cm. sand: 0.2 to 0.3 cm.
  Height of the water reserve: 200 cm.

350 m.$^3$ water per m.$^2$ sand were filtered in a 50-hour operation cycle, with a flow varying between 10 m.$^3$/m.$^2$/h. at the beginning of the cycle and 5 m.$^3$/m.$^2$/h. at the end of the cycle.

For the washing operation, only 2 m.$^3$ water per m.$^2$ of sand were necessary, and the operation lasted 2 minutes.

As a comparison, for a conventional ascending clarifier operation with beds of gravel and sand having the granulometric characteristics above defined, the filtration flow is kept constant at 7.5 m.$^3$/m.$^2$/h. during the entire cycle (duration: 25 h.)—amount of water filtrated: about 190 m.$^3$/m.$^2$; the self-cleaning speed is obtained when the loss of charge reaches 2.50 m.

The washing operation, also effected by ascending current, requires about 20 minutes with a washing water flow of 70 m.$^3$/m.$^2$/h.

It will also be soted that the present addition permits washing with already clarified water, which enables the apparatus to be used as soon as it is put back into operation, and in addition, that the volume of water used is much lower than that which would be necessary for an upward washing.

This mode of operation also causes, during the washing operation, a tucking of the sand which is favourable to a good clarification.

Additionally washing operations are obtained which are absolutely similar.

As already mentioned, the choice of a fixed speed involves a variation in the flow rate depending on the clogging extent of the sand. But, when intended to keep the advantages of a constant flow rate to the water processing installation, the clarifiers may be formed into groups of two, three or more, each constituent of a group being in such a cligging state that the average flow rate in each of the apparatus forming part thereof as there are grouped apparatus.

This arrangement has been illustrated in FIG. 2 in which three similar apparatus, A, B and C, are grouped, the same reference numerals designating the same parts.

In the case, the supply conduits 6a, 6b and 6c are connected to a common supply 6, whereas the discharge conduits of clarified water 9a, 9b and 9c are grouped into a common outflow 9, in which is measured the discharge flow rate, which is constantly equal to the admission flow rate in 6.

According to the invention, the three apparatus A, B and C, operate in parallel, but each of them at a different extent of clogging, so their individual flows rate differ, the total flow rate of the group remaining constantly equal to three times the normal flow rate of the apparatus.

To this end, during operation of the group, the three valves 7'a, 7'b and 7'c being closed, and the three apparatus being "clean," valve 6'a is opened, gates 6'b and 6'c being closed. Filter A is operated, as the whole amount of water runs through it. After some time, without modifying A or C, valve 6'b is opened, to set B into operatiin. Then, after another lapse of time, valve 6'c is opened and the whole, group is operating.

Under these circumstances, the flow rate $d_A$, $d_B$ and $d_C$ of each the filters A, B and C is different, but the total flow rate $d$- of clarified water, discharged in 9, is always equal to that of the dirty water admitted in 6, and, as time passes, the individual flow rate of A, B, C, will constantly vary, the equality remaining effective= $d=d_A+d_B+d_C$, nominal flow rate of a filter × 3.

At a given time, A will become clogged and it will be necessary to purify it. $6'a$ will then be closed and $7'a$ opened, $7'a$ being a quick release valve, which, due to the large size of conduit $7a$ and charge H, will cause a very rapid purification and will drive out all the material clogging the filtrating materials. During this period:

$$d=d_B+d_C=3d_N$$

Subsequently, B will be purified, then C, and so on.

The installation will thus continuously operate with $$\begin{cases} d=3d_n \\ d=d_A+d_B+d_C \\ d_A \neq d_B = /d_C \end{cases}$$

or more generally with $k$ filters:

$$\begin{cases} d=kd_n \\ d=\Sigma d_k \\ d_A \neq d_B \neq d_C \neq \ldots \neq d_k \end{cases}$$

it being understood that periodically some of the $d_K$ will be equal to zero during purification of filter K.

Due to the fact that the washing operations, which are obtained, are always repeated exactly in the same manner, the problem of perfect and automatic equilibrium of a group of apparatus is then solved, whatever their number. In fact, it is sufficient to put in operation one of the clarifiers immediately after washing, while the other clarifiers each have different degrees of clogging, to obtain the desired total flow rate.

Further, the washing operations will be effected after passage of a given flow rate, and the equilibrium of the group of apparatus will remain constant.

Such advantages permit the use of the ascending current clarifier in a number of applications.

Thus, for example, by passing through the filtrating medium in the clarifier according to the invention, a water which would have required a given amount of coagulant reageant to floculate, will only require a lesser amount to be clarified.

Several tests have shown that it was perfectly possible to consider, for producing drinkable water, using a clarifier with ascending current according to the invention, instead of a decanter. The apparatus thus behaves like an actual mud accumulator, on which is sent the crude water including floculate. This accumulator then behaves as an effective mud accumulator, on which crude water comprising floculates is directed. This accumulator may optionally be followed or with a conventional filter, depending upon the quality required from the treated water.

It should be noted that in the specification, reference has been made to the use of sand as the filtrating material; but this is only to be considered as an example, any other filtrating material being possible used jointly with or instead of sand.

In addition, it should be well understood that, in the case where a number of filters are grouped, all the clarifiers must be similar.

What is claimed is:

1. A process for clarifying water comprising assembling a filter of beds of filtrating materials having a downwardly increasing granulometry, passing water to be clarified upwardly through the filter at a velocity less than the speed at which filtered particles from the water in the bed would be carried upwardly by the water, maintaining the head loss in the filter constant so that the velocity of the water through the particles of the filter will remain substantially constant while the flow rate progressively diminishes as the filter becomes clogged, maintaining a water reserve above the filter at least equal to the intersticial volume of the filtering materials, terminating inflow of water when the filter becomes clogged accompanied by reduced flow rate, and thereafter suddenly releasing the water reserve without any intermediate supply of water to the filter after the terminating of inflow for downward flow of the water reserve through the filter to clean the same.

2. A process as claimed in claim 1 comprising connecting a plurality of filters in parallel and joining the filters to a common inlet and a common outlet, and periodically cleaning the filters in succession, to provide a substantially uniform outflow at the outlet despite the variation in the individual flow rate through each filter.

References Cited

UNITED STATES PATENTS

| | | | |
|---|---|---|---|
| 1,232,805 | 7/1917 | Jewell | 210—80 |
| 1,838,263 | 12/1931 | Kelley | 210—290 |
| 2,685,565 | 8/1954 | Jones et al. | 210—80 X |
| 2,723,761 | 11/1955 | Mane et al. | 210—290 X |
| 3,276,585 | 10/1966 | Kalinske | 210—80 |
| 3,405,806 | 10/1968 | Okada | 210—290 X |

JOHN W. ADEE, Primary Examiner

U.S. Cl. X.R.

80—290